(12) United States Patent
Akiba

(10) Patent No.: US 9,779,001 B2
(45) Date of Patent: Oct. 3, 2017

(54) MIRRORING DEVICE, CONTROL METHOD THEREOF, AND STORAGE MEDIUM THAT MAINTAIN DIFFERENCE IN REMAINING WRITABLE AMOUNTS OF DATA

(71) Applicant: CANON KABUSHIKI KAISHA, Tokyo (JP)

(72) Inventor: Tomohiro Akiba, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 134 days.

(21) Appl. No.: 14/575,123

(22) Filed: Dec. 18, 2014

(65) Prior Publication Data

US 2015/0193318 A1    Jul. 9, 2015

(30) Foreign Application Priority Data

Jan. 6, 2014    (JP) ................................. 2014-000291

(51) Int. Cl.
  *G06F 11/20* (2006.01)
  *G06F 11/14* (2006.01)
  *G06F 11/10* (2006.01)

(52) U.S. Cl.
  CPC ...... *G06F 11/2069* (2013.01); *G06F 11/1092* (2013.01); *G06F 11/1458* (2013.01); *G06F 11/2058* (2013.01); *G06F 11/2087* (2013.01); *G06F 11/2082* (2013.01); *G06F 11/2094* (2013.01); *G06F 2201/81* (2013.01); *G06F 2201/84* (2013.01); *G06F 2201/855* (2013.01)

(58) Field of Classification Search
  CPC .... G06F 3/0614; G06F 3/0617; G06F 3/0619; G06F 2212/7211; G06F 2212/1032; G06F 2212/103; G06F 12/0246; G06F 11/20; G06F 11/2053; G06F 11/2094; G06F 11/2097; G06F 11/2058; G11C 16/349; G11C 16/3495
  See application file for complete search history.

(56) References Cited

U.S. PATENT DOCUMENTS 7,032,087 B1 * 4/2006 Chang ................. G06F 12/0246
                                                   711/103
7,523,013 B2 * 4/2009 Gorobets .............. G06F 11/008
                                                   702/176

(Continued)

FOREIGN PATENT DOCUMENTS

JP    2013-077283 A    4/2013

*Primary Examiner* — Joseph Schell
(74) *Attorney, Agent, or Firm* — Rossi, Kimms & McDowell LLP

(57) ABSTRACT

A mirroring device that can improve, even when two storage devices to which an upper limit is set for the number of rewrites of data are used, the fault tolerance of the mirroring device while preventing one of the storage devices from reaching the lifetime thereof early. A mirroring device comprises two storage devices to which an upper limit is set for the number of rewrites of data. Remaining writable amounts of the data in the storage devices are acquired respectively from total amounts of the data written in the respective storage devices. When it is determined that a difference between the respective acquired remaining writable amounts is less than a predetermined value, the respective storage devices are controlled such that the difference becomes equal to or more than the predetermined value.

9 Claims, 7 Drawing Sheets

(56) References Cited

U.S. PATENT DOCUMENTS

| | | | |
|---|---|---|---|
| 2008/0140918 A1* | 6/2008 | Sutardja | G06F 12/0246 |
| | | | 711/103 |
| 2010/0205363 A1* | 8/2010 | Hwang | G11C 16/349 |
| | | | 711/104 |
| 2012/0017052 A1* | 1/2012 | Sauber | G06F 12/0246 |
| | | | 711/154 |
| 2013/0067144 A1 | 3/2013 | Namba et al. | |
| 2015/0220397 A1* | 8/2015 | Uchiyama | G06F 11/1096 |
| | | | 714/6.24 |
| 2016/0034387 A1* | 2/2016 | Megarity | G06F 12/0246 |
| | | | 711/103 |

\* cited by examiner

MIRRORING DEVICE, CONTROL METHOD THEREOF, AND STORAGE MEDIUM THAT MAINTAIN DIFFERENCE IN REMAINING WRITABLE AMOUNTS OF DATA

BACKGROUND OF THE INVENTION

Field of the Invention

The present invention relates to a mirroring device including two storage devices to which an upper limit is set for the number of rewrites of data and a control method of the mirroring device, and a storage medium.

Description of the Related Art

As SSDs (Solid State Drive) come into widespread use, the SSDs have been installed in image formation devices, as auxiliary storage devices. As compared with conventional auxiliary storage devices, the SSDs have advantages in access time, heat generation, operation noise, shock-resistant performance, power consumption, size, and the like, but have disadvantage in that the number of rewrites of data has an upper limit.

As devices relating to such auxiliary storage devices, mirroring devices having a fault tolerance that is improved based on the fact that a probability of simultaneous break of two storage disks is low, are known.

Now, when two SSDs are applied to a mirroring device to improve a fault tolerance, the two SSDs reach the lifetimes thereof at almost the same time based on the number of rewrites of data because writing the same data in the two SSDs is repeated.

Therefore, when two SSDs are applied to a mirroring device, the fault tolerance of the mirroring device is not improved although a mirroring configuration is implemented, which is problematic.

To cope with this problem, there has been proposed a technique in which, when data is to be written in one of SSDs, dummy data is added to the data to cause a difference between the number of rewritable times of data in the two SSDs, which prevents the two SSDs from reaching the lifetimes thereof at almost the same time (e.g., refer to Japanese Laid-Open Patent Publication (Kokai) No. 2013-77283).

However, in the technique of Japanese Laid-Open Patent Publication (Kokai) No. 2013-77283, since dummy data is repeatedly stored in only one of the SSDs, the dummy data stored in an accumulating manner causes the one SSD to reach the lifetime early.

That is, the problem with a mirroring device including two SSDs is that it is impossible to improve the fault tolerance thereof while preventing one of the SSDs from reaching the lifetime thereof early.

SUMMARY OF THE INVENTION

The present invention provides a mirroring device that can improve, even when two storage devices to which an upper limit is set for the number of rewrites of data are used, the fault tolerance of the mirroring device while preventing one of the storage devices from reaching the lifetime thereof early and a control method of the mirroring device, and a storage medium.

Accordingly, an aspect of the present invention provides a mirroring device comprising two storage devices to which an upper limit is set for the number of rewrites of data, an acquisition unit configured to acquire respectively remaining writable amounts of the data in the storage devices from total amounts of the data written in the respective storage devices, a determination unit configured to determine whether a difference between the respective remaining writable amounts of the data acquired by the acquisition unit is equal to or more than a predetermined value, and a control unit configured to, when the determination unit determines that the difference is less than the predetermined value, control the respective storage devices such that the difference becomes equal to or more than the predetermined value.

According to the present invention, when a difference in remaining writable amount between the two storage devices is less than a predetermined value, the storage device is controlled such that the difference becomes equal to or more than the predetermined value, and thus it is possible to separate periods in which the two storage devices reach the lifetimes thereof without repeatedly storing dummy data in only one of the storage devices. As a result, even when two storage devices to which an upper limit is set for the number of rewrites of data are used, it is possible to improve a fault tolerance while preventing one of the storage devices from reaching the lifetime thereof early.

Further features of the present invention will become apparent from the following description of exemplary embodiments (with reference to the attached drawings).

DESCRIPTION OF THE EMBODIMENTS

An embodiment of the present invention will be described below in detail with reference to the drawings.

Figure 1:
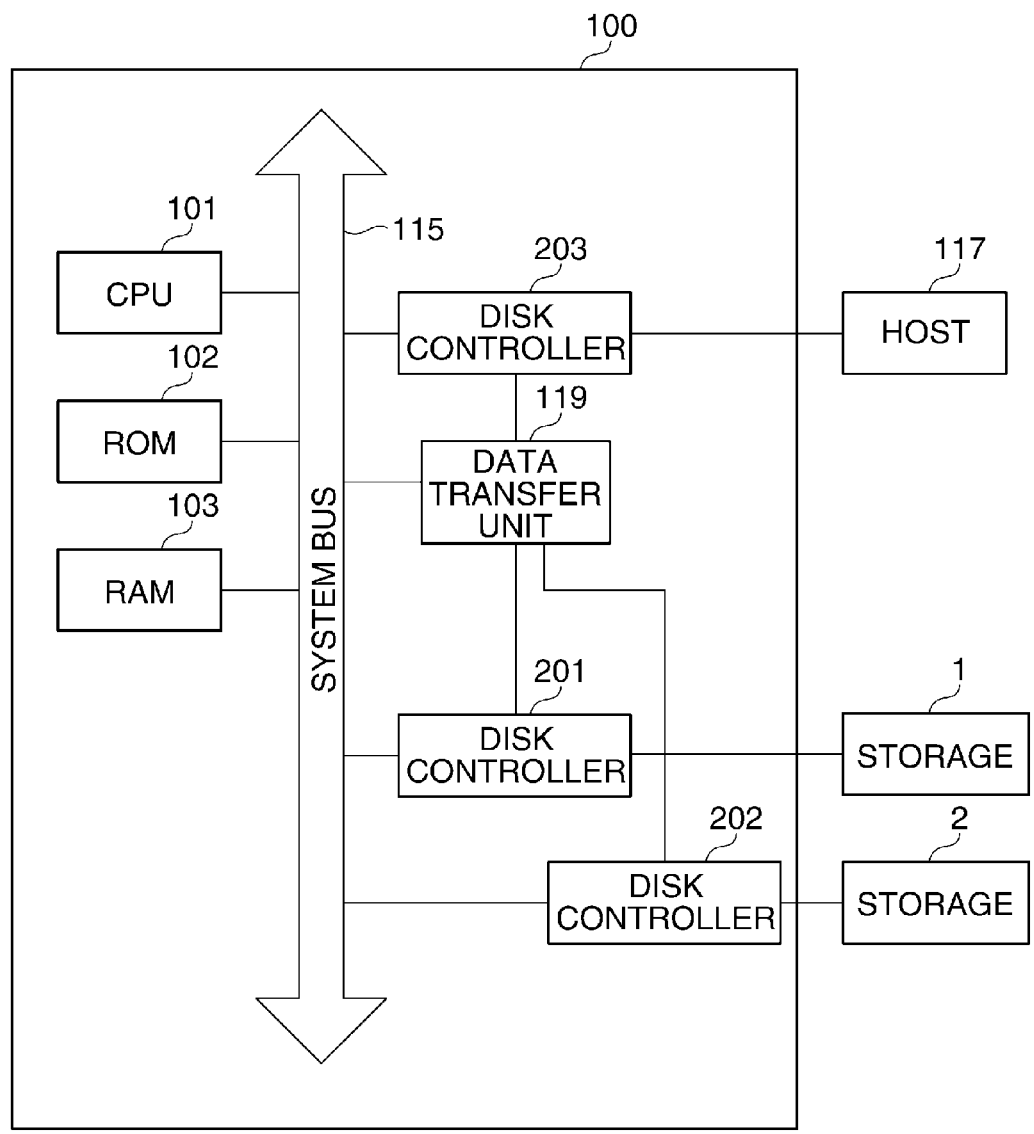
FIG. 1 is a diagram showing the schematic configuration of a mirroring device according to an embodiment of the present invention.

FIG. 1 is a diagram showing the schematic configuration of a mirroring device 100 according to the embodiment of the present invention.

In FIG. 1, the mirroring device 100 is connected to storages 1 and 2 being two storage devices to which an upper limit is set for the number of rewrites of data, and a host 117.

The storages 1 and 2 are SSDs (Solid State Drive). The host 117 stores information on the storages 1 and 2, and as will be described hereafter, the mirroring device 100 acquires the information on the storages 1 and 2 from the host 117.

In addition, the mirroring device 100 is configured by a CPU 101, a ROM 102, a RAM 103, disk controllers 201, 202, and 203, and a data transfer unit 119, and the components are connected to a system bus 115.

The CPU 101 controls the entire mirroring device 100. The ROM 102 stores various programs and various pieces of data. The RAM 103 is used as a work area for the CPU 101, and stores various programs and various pieces of data.

Flow charts in FIG. 2 to FIG. 7 to be described hereafter show procedures of processing in which the CPU 101 executes the programs stored in the ROM 102 or the RAM 103.

The disk controller 201 performs control to read data stored in the storage 1, and to write data in the storage 1.

The disk controller 202 performs control to read data stored in the storage 2, and to write data in the storage 2.

The disk controller 203 is connected to the host 117 to acquire the above-described information on the storages 1 and 2 and the like from the host 117.

The data transfer unit 119 is connected to the disk controllers 201 and 202 to perform data transfer between the disk controllers 201 and 202.

In processing to store data output from the host 117 in, for example, the storage 1, the data output from the host 117 is stored in the RAM 103 via the disk controller 203.

Subsequently, the stored data is read from the RAM 103 by the data transfer unit 119, and the data is stored in the storage 1 via the disk controller 201.

In the above-described configuration, the storages 1 and 2 are controlled such that the same data is stored, in principle. In this case, one of the storages 1 and 2 serves as a master, and the other serves as a slave, and the master and the slave change places with each other due to failure, attachment/detachment, or the like. In both cases, the master is one of the storages 1 and 2, and the slave is the other.

Is should be noted that the configuration of the mirroring device 100 in FIG. 1 is a configuration in which the two storages 1 and 2 are connectable, and may be a configuration in which still other storages are connectable.

Furthermore, the two storages 1 and 2, and the host 117 are connected to the outside of the mirroring device 100 in FIG. 1, and may be provided inside the mirroring device 100.

Next, a remaining writable amount of data in the present embodiment (hereafter, merely referred to as a "writable amount") and the like will be described. To acquire the writable amount, a total amount of writes (hereafter, merely referred to as a "total writing amount") is first acquired. The total writing amount (a total amount of data having been written) can be acquired by a SMART command, which is a kind of ATA command communicated between the SSDs and the disk controllers, or a vendor specific command. In the present embodiment, the total writing amounts of the master and the slave are acquired via the disk controllers 201 and 202.

Next, lifetime information is acquired. This lifetime information is equivalent to the number of rewritable times of the SSD, and is typically a product of the capacity of the SSD and the number of rewritable times of data. Therefore, the lifetime information is expressed by the following expression. The lifetime information=the capacity of the SSD×the number of rewritable times.

This lifetime information is acquired from the host 117 in the present embodiment, and may be stored in the ROM 102 in advance.

The writable amount is acquired from the acquired total writing amount and lifetime information, based on the following expression.

The writable amount=the lifetime information−the total writing amount=the capacity of the SSD× the number of rewritable times−the total writing amount.

That is, the writable amount in the present embodiment is equivalent to the amount of data that can be further written in each of the storages 1 and 2.

In the above-described expression, since the total writing amount increases as data is stored in the SSD whereas the lifetime information is constant, the writable amount is to decrease as data is written in the two storages 1 and 2.

In the present embodiment, the writable amounts of both the master and the slave are acquired, and the control is performed such that a difference between these writable amounts becomes equal to or more than a predetermined value. This predetermined value is a value depending on the degree of access of the host 117 to the SSDs. Therefore, the predetermined value is acquired from the host 117.

In the present embodiment, by performing the control such that the difference between the writable amounts becomes equal to or more than the predetermined value, it is possible to separate periods in which the storages 1 and 2 reach the lifetimes thereof without repeatedly storing dummy data in only one of the storages 1 and 2, which restrains the storages 1 and 2 from breaking simultaneously. It should be noted that, in the present embodiment, although the predetermined value is acquired from the host 117, the periods in which the storages 1 and 2 reach the lifetimes thereof can be substantially securely separated as long as the predetermined value is at least not zero, and thus the mirroring device 100 may retain the predetermined value in advance.

In addition, in the following description, the writable amount of the master may be expressed by A, the writable amount of the slave may be expressed by B, a difference in writable amount between the master and the slave may be expressed by D ($=|A-B|$), and the predetermined value may be expressed by T.

Figure 2:
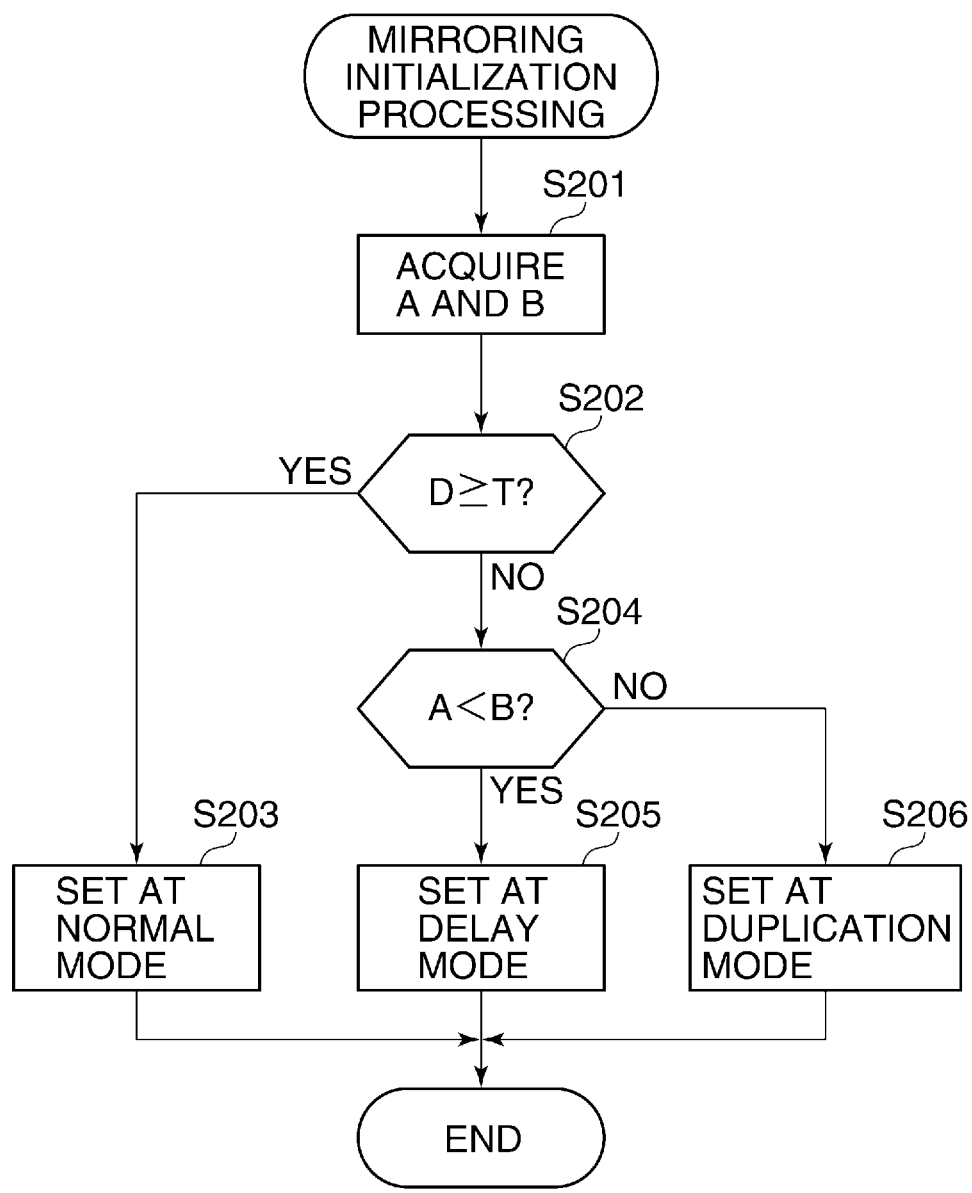
FIG. 2 is a flow chart showing a procedure of mirroring initialization processing that is performed by a CPU in FIG. 1.

FIG. 2 is a flow chart showing a procedure of mirroring initialization processing that is performed by the CPU 101 in FIG. 1.

In FIG. 2, writable amounts A and B of the master and the slave are first acquired (step S201). This step S201 corresponds to an acquisition unit configured to acquire the remaining writable amounts of data in the storages 1 and 2.

Next, it is determined whether or not a difference D in writable amount between the master and the slave is equal to or more than the predetermined value T (step S202). This step S202 corresponds to a determination unit configured to determine whether or not the difference in the acquired writable amount between the storages 1 and 2 is equal to or more than the predetermined value.

When a determination result of step S202 indicates that the difference D is equal to or more than the predetermined value T (YES in step S202), the processing mode is set at a normal mode (step S203), and this processing is terminated.

The normal mode is a mode in which whenever data is stored once in the master, the same data is stored only once in the slave.

In contrast, when the determination result of step S202 indicates that the difference D is less than the predetermined value T (NO in step S202), it is determined whether or not the writable amount A of the master is less than the writable amount B of the slave (step S204).

When a determination result of step S204 indicates that the writable amount A of the master is less than the writable amount B of the slave (YES in step S204), the processing mode is set at a delay mode (step S205), and this processing is terminated.

The delay mode is a mode in which data is stored in the master and a predetermined period of time elapses before the same data is stored in the slave.

In contrast, when the determination result of step S204 indicates that the writable amount A of the master is equal to or more than the writable amount B of the slave (NO in step S204), the processing mode is set at a duplication mode (step S206), and this processing is terminated.

The duplication mode is a mode in which whenever data is stored once in the master, the same data is repeatedly stored in the slave a preset number of times. In step S206, the number of times is set by the CPU 101, and the number of times may be set by a user.

Figure 3:
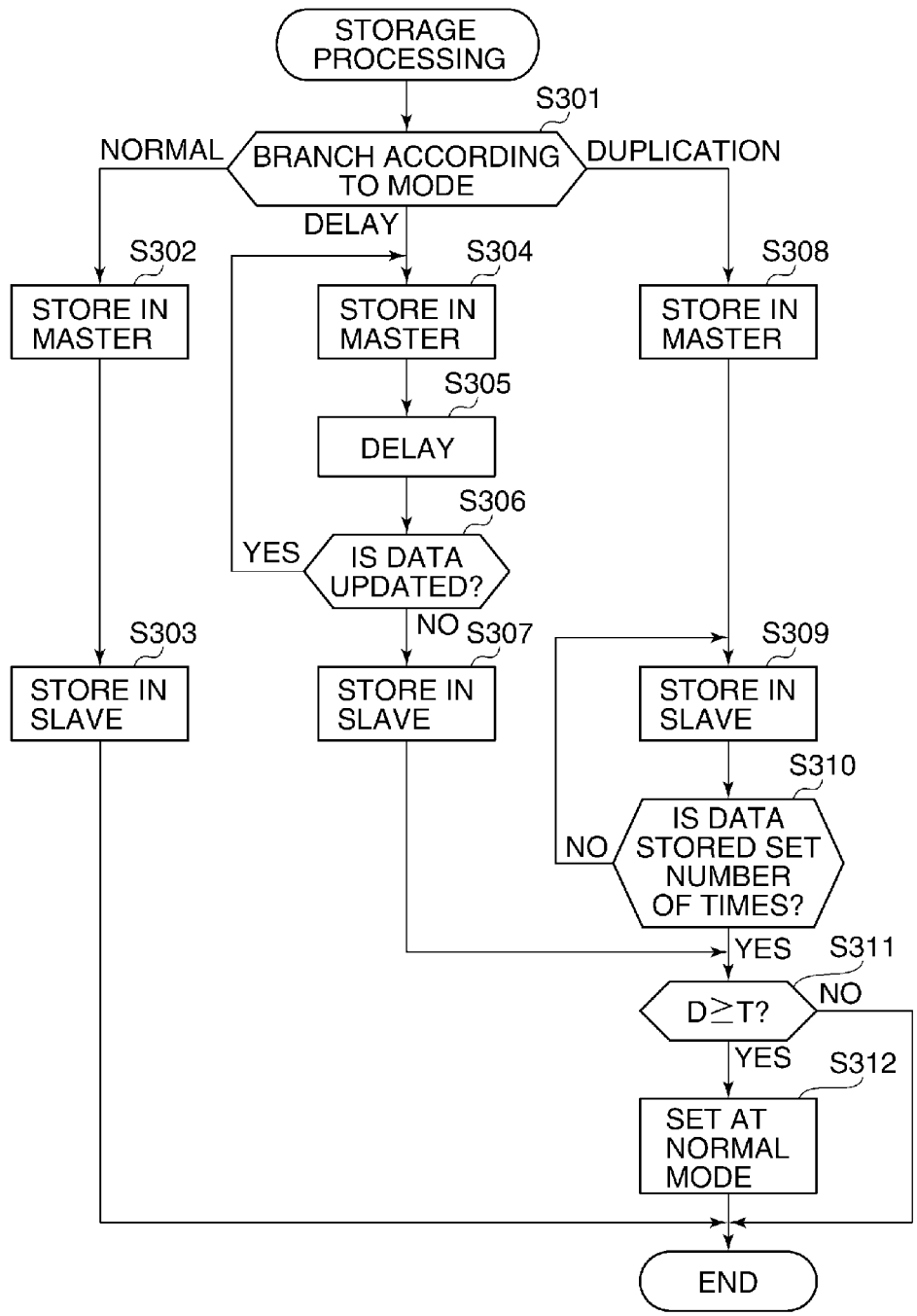
FIG. 3 is a flow chart showing a procedure of storage processing that is performed by the CPU in FIG. 1.

FIG. 3 is a flow chart showing a procedure of storage processing that is performed by the CPU 101 in FIG. 1.

In FIG. 3, the processing first branches according to the mode that is determined in the mirroring initialization processing in FIG. 2 (step S301).

When a determination result of step S301 indicates that the determined mode is the normal mode (NORMAL in step S301), data is stored in the master (step S302) and the data is also stored in the slave (step S303), and this processing is terminated.

It should be noted that, in FIG. 3, the processing is performed in an order of steps S301, and 302, and the steps S301 and 302 may be performed simultaneously. In this case, the data transfer unit 119 stores data stored in the RAM 103 to the storage 1 via the disk controller 201, and to the storage 2 via the disk controller 202, simultaneously. It should be noted that, also in each flow chart to be described hereafter, data may be stored in the slave and the master simultaneously instead of storing data in the master and thereafter storing the data also in the slave.

When a determination result of step S301 indicates that the determined mode is the delay mode (DELAY in step S301), data is first stored in the master (step S304). Next, storing the data in the slave is delayed (step S305).

The data may be updated due to new data to be stored that is output from the host 117, while the storing the data is delayed.

To deal with this, after the storing the data in the slave is delayed, it is determined whether or not the data is updated (step S306). When a determination result of step S306 indicates that the data is updated (YES in step S306), the processing returns to above-described step S304.

In contrast, when the determination result of step S306 indicates that the data is not updated (NO in step S306), the data is stored in the slave (step S307).

Next, it is determined whether or not the difference D in writable amount between the master and the slave is equal to or more than the predetermined value T (step S311).

When a determination result of step S311 indicates that the difference D is equal to or more than the predetermined value T (YES in step S311), the processing mode is set at normal mode (step S312), and this processing is terminated.

In contrast, when the determination result of step S311 indicates that the difference D is less than the predetermined value T (NO in step S311), this processing is terminated with the delay mode maintained.

When the determination result of step S301 indicates that the determined mode is the duplication mode (DEPLICATION in step S301), data is first stored in the master (step S308). Next, the data is stored in the slave (step S309), and it is determined whether or not the data is repeatedly stored in the slave the number of times that is set in step S206 in FIG. 2 (step S310).

When a determination result of step S310 indicates that the data is not stored in the slave repeatedly the set number of times (NO in step S310), the processing returns to step S309.

In contrast, when the determination result of step S310 indicates that the data is repeatedly stored in the slave the set number of times (YES in step S310), the processing proceeds to above-described step S311. It should be noted that when the difference D is here less than the predetermined value T (NO in step S311), this processing is terminated with the duplication mode maintained.

The storage processing in FIG. 3 will be described in detail giving a supplementary explanation as follows. First, give attention to the inability of A and B being the writable amounts to increase, and $D=|A-B|$.

Under the above preconditions, first, when the processing branches to the flow corresponding to the normal mode in step S301, the difference in writable amount between the master and the slave is equal to or more than the predetermined value since $D \geq T$ is satisfied, and thus the same data, namely data having the same amount, is stored in the master and the slave.

In addition, when the processing branches to the flow corresponding to the delay mode in step S301, $D<T$ and $A<B$ are satisfied. To satisfy $D \geq T$ to return from the delay mode to the normal mode, $B-A$ ($=D$) may be increased. To deal with this, in the storage processing in FIG. 3, the storing data in the slave is delayed to restrain the number of times of storing data in the slave from increasing, which relatively increases the number of times of storing data in the master. As a result, A decreases faster than B, which increases B−A.

Next, when the processing branches to the flow corresponding to the duplication mode in step S301, $D<T$ and $A \geq B$ are satisfied. To satisfy $D \geq T$ to return from the duplication mode to the normal mode, $A-B$ ($=D$) may be increased. To deal with this, in the storage processing in FIG. 3, the storing data in the slave is performed the set number of times, which relatively increases the number of times of storing data in the slave. As a result, B decreases faster than A, which increases A−B.

In such a manner, in the present embodiment, when the difference is determined to be less than the predetermined value, the storages 1 and 2 are controlled such that the difference becomes equal to or more than the predetermined value. More in detail, the storages 1 and 2 are controlled such that the number of times of storing data in one of the storages 1 and 2 having a smaller writable amount (first storage device) is increased more than the number of times of storing data in the other one of the storages 1 and 2 having a larger writable amount (second storage device).

For example, in above-described steps S304 to 307 in FIG. 3, the storages 1 and 2 are controlled such that data is stored in the master having a smaller writable amount (step S304) and the predetermined period of time elapses before the data is stored in the slave having a larger writable amount (step S307).

Furthermore, in steps S308 to 310 in FIG. 3, the storages 1 and 2 are controlled such that whenever data is once stored in the master having a larger writable amount (step S308), the data is repeatedly stored in the slave having a smaller writable amount the preset number of times (steps S309 and 310).

In the above-described processing in FIGS. 2 and 3, there are three modes, the normal mode, delay mode, and duplication mode, which are set as the processing mode, and there will be described the processing in a case where there are only two modes, the normal mode and the duplication mode, which are set as the processing mode.

Figure 4:
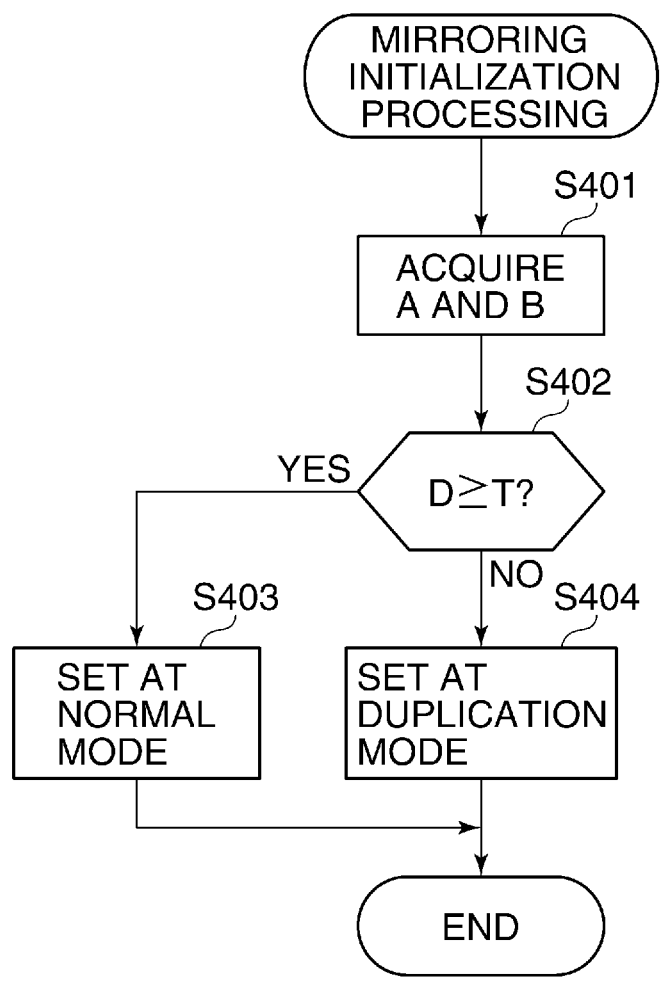
FIG. 4 is a flow chart showing a procedure of mirroring initialization processing that is performed by the CPU in FIG. 1.

FIG. 4 is a flow chart showing a procedure of the mirroring initialization processing that is performed by the CPU 101 in FIG. 1.

In FIG. 4, the writable amounts A and B of the master and the slave are first acquired (step S401).

Next, it is determined whether or not the difference D in the writable amount between the master and the slave is equal to or more than the predetermined value T (step S402). When a determination result of step S402 indicates that the difference D is equal to or more than the predetermined value T (YES in step S402), the processing mode is set at the normal mode (step S403), and this processing is terminated.

In contrast, when the determination result in step S402 indicates that the difference D is less than the predetermined value T (NO in step S402), the processing mode is set at the duplication mode and the number of times that the data is repeatedly stored in the slave or the master is set as well (step S404), and this processing is terminated.

Figure 5:
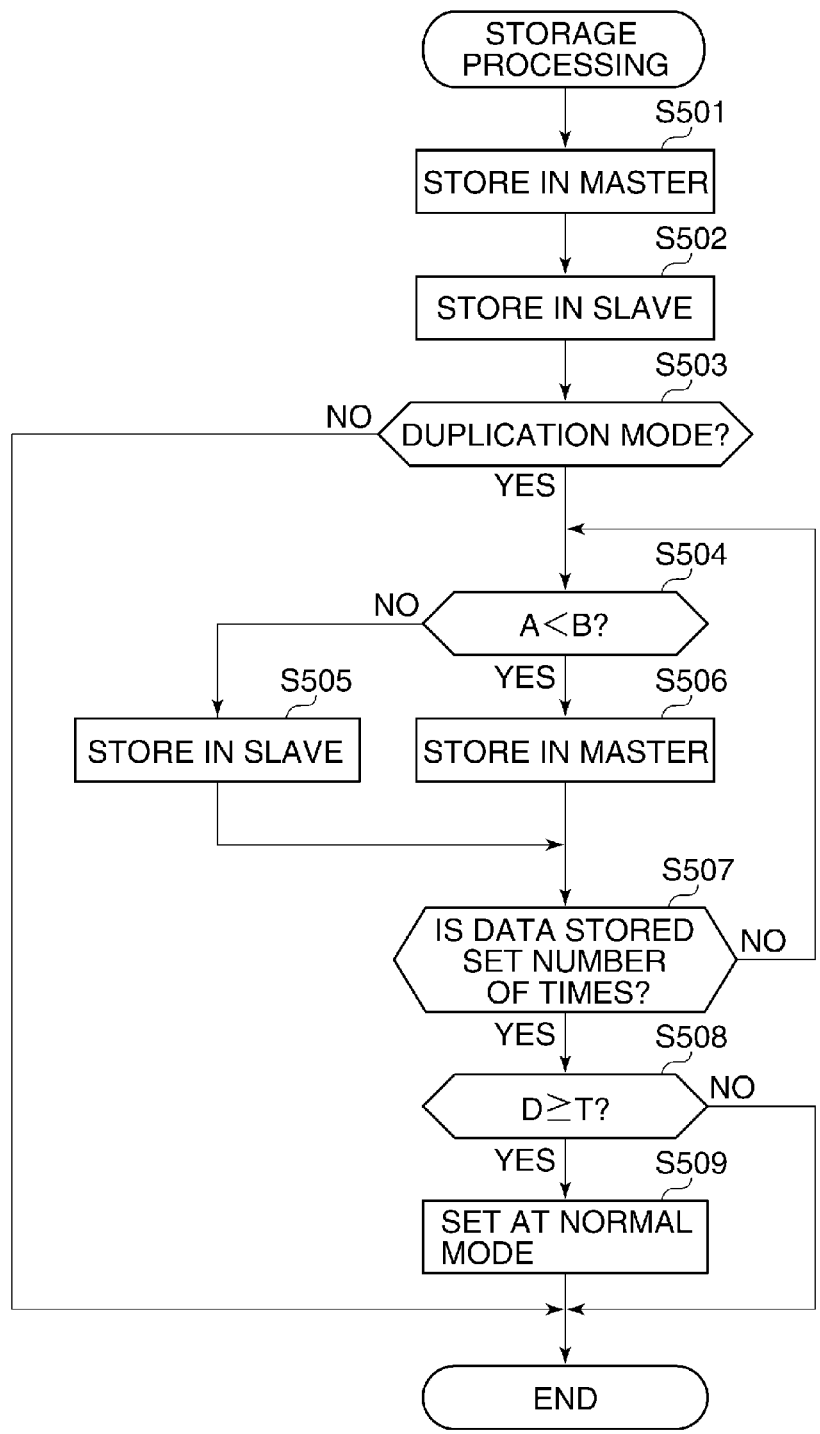
FIG. 5 is a flow chart showing a procedure of storage processing that is performed by the CPU in FIG. 1.

FIG. 5 is a flow chart showing a procedure of the storage processing that is performed by the CPU 101 in FIG. 1.

In FIG. 5, data is first stored in the master (step S501), and the data is stored also in the slave (step S502).

Next, it is determined whether or not the mode determined in the mirroring initialization processing in FIG. 4 is the duplication mode (step S503).

When a determination result in step S503 indicates that the determined mode is not the duplication mode (NO in step S503), this processing is terminated.

In contrast, when the determination result in step S503 indicates that the determined mode is the duplication mode (YES in step S503), it is determined whether or not the writable amount A of the master is less than the writable amount B of the slave (step S504).

When a determination result in step S504 indicates that the writable amount A of the master is equal to or more than the writable amount B of the slave (NO in step S504), data is stored in the slave (step S505), and the processing proceeds to step S507.

In contrast, when the determination result in step S504 indicates that the writable amount A of the master is less than the writable amount B of the slave (YES in step S504), data is stored in the master (step S506).

Next, it is determined whether or not data is repeatedly stored in the master (when step S506 is performed) or the slave (when step S505 is performed) the number of times that is set in step S404 in FIG. 4 (step S507).

When a determination result in step S507 indicates that data is not repeatedly stored in the master or the slave the set number of times (NO in step S507), the processing returns to step S504.

In contrast, when the determination result in step S507 indicates that data is repeatedly stored in the master or the slave the set number of times (YES in step S507), the processing mode is set at the normal mode (step S203), and this processing is terminated.

The storage processing in FIG. 5 will be described in detail giving a supplementary explanation as follows. In above-described steps S504 to S506, when A<B is satisfied, the number of times of storing data in the master is increased to restrain the number of times of storing data in the slave from increasing, which relatively increases the number of times of storing data in the master. As a result, A decreases faster than B, which increases B−A.

In contrast, when A≥B is satisfied, the number of times of storing data in the slave is increased to restrain the number of times of storing data in the master from increasing, which relatively increases the number of times of storing data in the slave. As a result, B decreases faster than A, which increases A−B.

Next, there will be described processing to perform control using dummy data so as to satisfy D≥T.

Figure 6A:
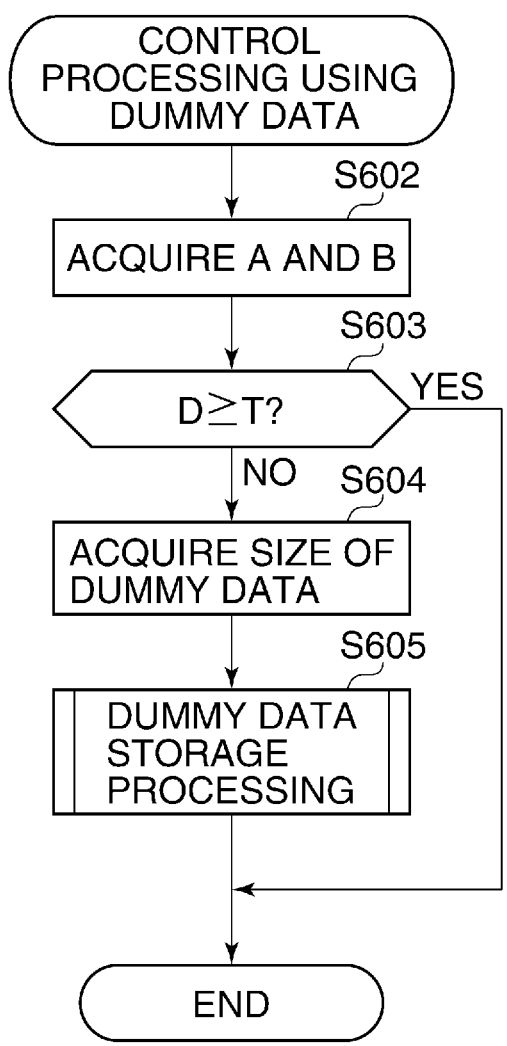
FIG. 6A is a flow chart showing a procedure of control processing using dummy data that is performed by the CPU in FIG. 1.
Figure 6B:
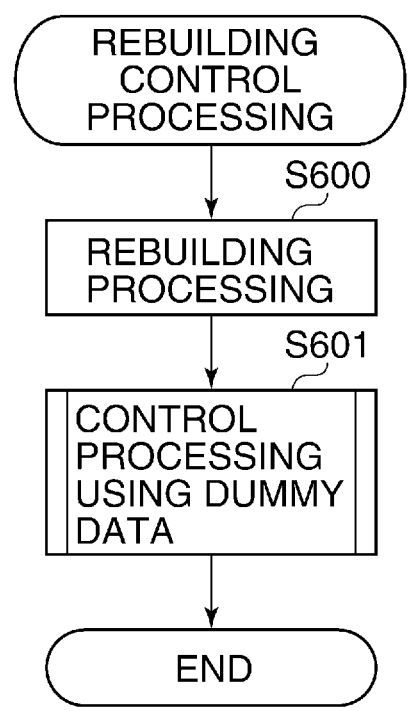
FIG. 6B is a flow chart showing a procedure of rebuilding control processing.

FIG. 6A is a flow chart showing a procedure of control processing using dummy data that is performed by the CPU 101 in FIG. 1, and FIG. 6B is a flow chart showing a procedure of rebuilding control processing.

In FIG. 6A, the writable amounts A and B of the master and the slave are first acquired (step S602).

Next, it is determined whether or not the difference D in writable amount between the master and the slave is equal to or more than the predetermined value T (step S603). When a determination result in step S603 indicates that the difference D is equal to or more than the predetermined value T (YES in step S603), this processing is terminated.

Figure 7:
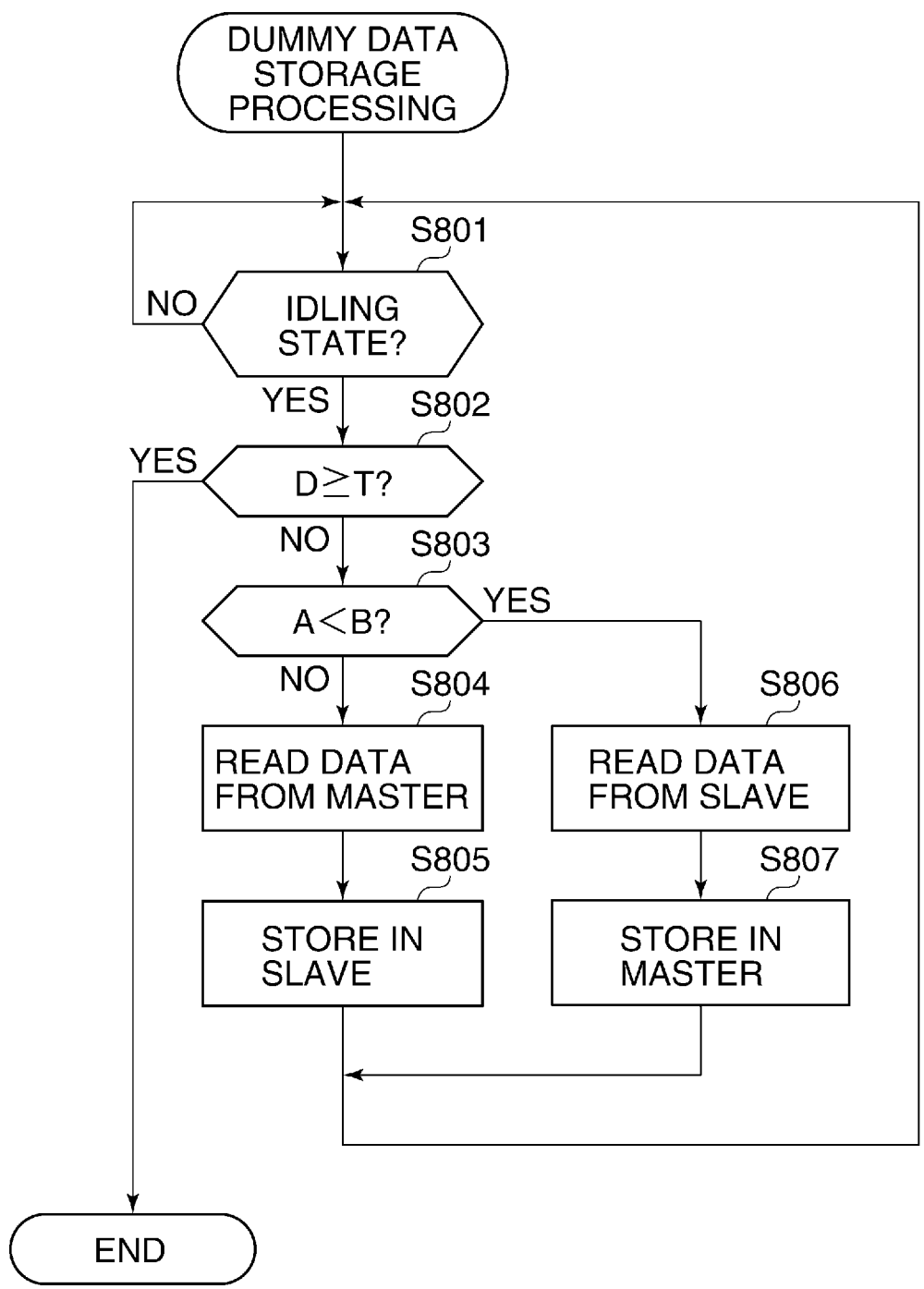
FIG. 7 is a flow chart showing a procedure of dummy data storage processing in step S605 in FIG. 6A.

In contrast, when the determination result in step S603 indicates that the difference D is less than the predetermined value T (NO in step S603), the size of the dummy data (T−D) to be used in dummy data storage processing in FIG. 7 to be described hereafter, is acquired (step S604).

Next, the dummy data storage processing in FIG. 7 to be described hereafter is performed (step S605), and this processing is terminated.

The rebuilding control processing in next FIG. 6B is processing to perform control so as to satisfy D≥T even in rebuilding, and in the description here, it is assumed that the master is the storage 1, and the slave is the storage 2, for convenience.

The rebuilding processing in the present embodiment is processing to perform processing, in which the data transfer unit 119 reads data from the storage 1 via the disk controller 201, and the read data is stored in the storage 2 via the disk controller 202, over the entire area of the storage 1. That is, the rebuilding processing is processing to copy the entire data in the storage 1 to the storage 2, and the storages 1 and 2 have the same data stored therein as the rebuilding processing is terminated.

In FIG. 6B, the above-described rebuilding processing is first performed (step S600), the control processing using dummy data in FIG. 6A is performed (step S601), and this processing is terminated.

FIG. 7 is a flow chart showing a procedure of the dummy data storage processing in step S605 in FIG. 6A.

In FIG. 7, first in a state that normal storage processing is not performed on the storages 1 and 2, namely an idling state (YES in step S801), it is determined whether or not the difference D in writable amount between the master and the slave is equal to or more than the predetermined value T (step S802).

When a determination result in step S802 indicates that the difference D is equal to or more than the predetermined value T (YES in step S802), this processing is terminated.

In contrast, when the determination result in step S802 indicates that the difference D is less than the predetermined value T (NO in step S802), it is determined whether or not the writable amount A of the master is less than the writable amount B of the slave (step S803).

When a determination result in step S803 indicates that the writable amount A of the master is less than the writable amount B of the slave (YES in step S803), data is read from the master by the size of the dummy data acquired in step S604 in FIG. 6 (step S804). Then, the read dummy data is stored in the slave (step S805), and this processing is terminated.

In contrast, when the determination result in step S803 indicates that the writable amount A of the master is equal to or more than the writable amount B of the slave (NO in step S803), data is read from the slave by the size of dummy data that is acquired in step S604 in FIG. 6A (step S806). Then, the read dummy data is stored in the master (step S807), and this processing is terminated. In such a manner, in the present embodiment, the storages 1 and 2 are controlled such that the dummy data is stored in the slave or the master having a smaller writable amount (steps S805 and 807). In addition, as shown in FIG. 6B, in the present embodiment, the dummy data is stored after the rebuilding processing of the slave and the master is finished.

In above-described steps S804 to 807, when A<B is satisfied, increasing the number of times of storing data in the master causes A to decrease, which increases B−A.

In contrast, when A≥B is satisfied, increasing the number of times of storing data in the slave causes B to decrease, which increases A−B.

It should be noted that, in processing in above-described steps S804 to 807, the data transfer unit 119 is used as with the rebuilding processing in step S600 in FIG. 6B.

Furthermore, in the present embodiment, in the processing in which the data transfer unit 119 is used, the transfer may be performed by the CPU 101 without using the data transfer unit 119.

In such a manner, in the present embodiment, in the case where the two storages 1 and 2 formed of SSDs are applied to the mirroring device 100, properly switching among the methods of storing data enables enhancing the fault tolerances of the storages 1 and 2 while restraining the lifetimes thereof from being shortened, which contributes to a user's convenience.

In addition, since the same data is stored in the storages 1 and 2, it is possible to resume the processing using data stored in any one of the storages 1 and 2 even when the mirroring is suspended, which contributes to a user's convenience.

As described above, according to the present embodiment, when the difference D in writable amount between the storages 1 and 2 is less than the predetermined value T (NO in step S202), by controlling the storages 1 and 2 such that the difference D becomes equal to or more than the above-described predetermined value T (steps S304 to 307, or steps S308 to 310), it is possible to separate periods in which the two storages 1 and 2 reach the lifetimes thereof without repeatedly storing the dummy data in only one of the storages 1 and 2. Even when the two storages 1 and 2 formed of SSDs to which an upper limit is set for the number of rewrites of data are used in the mirroring device 100, it is possible to improve the fault tolerance of the mirroring device 100 while preventing only one of the storages 1 and 2 from reaching the lifetime thereof early.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-000291, filed Jan. 6, 2014, which is hereby incorporated by reference wherein in its entirety.

What is claimed is:

1. A mirroring device comprising:
two storage devices to which an upper limit is set for a number of rewrites of data;
an acquisition unit configured to acquire respective remaining writable amounts of data in the storage devices from respective total amounts of data written in the storage devices;
a determination unit configured to determine whether a difference between the acquired respective remaining writable amounts of data is equal to or more than a predetermined value; and
a control unit configured to, when said determination unit determines that the difference is less than the predetermined value, control the storage devices such that the difference becomes equal to or more than the predetermined value.

2. The mirroring device according to claim 1,
wherein the two storage devices comprise a first storage device and a second storage device, and
wherein, when the difference is determined to be less than the predetermined value and the first storage device has a smaller remaining writable amount of data than that of the second storage device, said control unit is configured to control the first storage device and the second storage device such that a number of times of storing data in the first storage device is increased relative to a number of times of storing data in the second storage device.

3. The mirroring device according to claim 2, wherein said control unit is configured to control the first storage device and the second storage device such that when particular data is stored in the first storage device, a predetermined period of time elapses before the particular data is stored in the second storage device.

4. The mirroring device according to claim 2, wherein, when the difference is determined to be less than the predetermined value, said control unit is configured to control the first storage device and the second storage device such that whenever particular data is stored once in the second storage device, the particular data is repeatedly stored in the first storage device a preset number of times.

5. The mirroring device according to claim 2, wherein, when the difference is determined to be less than the predetermined value, said control unit is configured to control the first storage device and the second storage device such that dummy data is stored in the first storage device.

6. The mirroring device according to claim 5, wherein the dummy data is stored after rebuilding processing of the first storage device and the second storage device is finished.

7. A control method of a mirroring device including two storage devices to which an upper limit is set for a number of rewrites of data, the control method comprising:
    an acquisition step of acquiring respective remaining writable amounts of data in the storage devices from respective total amounts of data written in the storage devices;
    a determination step of determining whether a difference between the acquired respective remaining writable amounts of data is equal to or more than a predetermined value; and
    a control step of, when it is determined in said determination step that the difference is less than the predetermined value, controlling the storage devices such that the difference becomes equal to or more than the predetermined value.

8. A non-transitory computer readable storage medium storing a program configured to cause a computer to implement a control method of a mirroring device that mirrors two storage devices to which an upper limit is set for a number of rewrites of data, the control method comprising:
    an acquisition step of acquiring respective remaining writable amounts of data in the storage devices from respective total amounts of data written in the storage devices;
    a determination step of determining whether a difference between the acquired respective remaining writable amounts of data is equal to or more than a predetermined value; and
    a control step of, when it is determined in said determination step that the difference is less than the predetermined value, controlling the storage devices such that the difference becomes equal to or more than the predetermined value.

9. A mirroring device configured to connect to plural storage devices comprising:
    an acquisition circuit to acquire, from the storage devices, information with which respective remaining writable amounts of data in the storage devices can be identified, wherein the storage devices have upper limits regarding a number of rewrites of data; and
    a control circuit to control the storage devices such that a difference between the respective remaining writable amounts of data becomes equal to or more than a predetermined value in a case where the difference is less than the predetermined value.

\* \* \* \* \*